United States Patent
Kim et al.

(10) Patent No.: US 11,321,254 B2
(45) Date of Patent: May 3, 2022

(54) COMPUTING SYSTEM FOR TRANSMITTING COMPLETION EARLY BETWEEN SERIALLY CONNECTED ELECTRONIC DEVICES

(71) Applicant: SAMSUNG ELECTRONICS CO., LTD., Suwon-si (KR)

(72) Inventors: Dong-Uk Kim, Seoul (KR); Yohan Ko, Suwon-si (KR); Insoon Jo, Hwaseong-si (KR); Jooyoung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/007,553

(22) Filed: Aug. 31, 2020

(65) Prior Publication Data

US 2021/0224209 A1    Jul. 22, 2021

(30) Foreign Application Priority Data

Jan. 20, 2020   (KR) ........................ 10-2020-0007182

(51) Int. Cl.
*G06F 13/28* (2006.01)
*G06F 13/16* (2006.01)
*G06F 13/42* (2006.01)

(52) U.S. Cl.
CPC .......... *G06F 13/28* (2013.01); *G06F 13/1673* (2013.01); *G06F 13/4282* (2013.01); *G06F 2213/0026* (2013.01); *G06F 2213/2806* (2013.01)

(58) Field of Classification Search
CPC .. G06F 13/28; G06F 13/1673; G06F 13/4282; G06F 2213/0026; G06F 2213/2806
See application file for complete search history.

(56) References Cited

U.S. PATENT DOCUMENTS

| | | | |
|---|---|---|---|
| 7,502,884 B1 * | 3/2009 | Shah | H04L 67/1097 370/395.21 |
| 8,677,028 B2 | 3/2014 | Krom et al. | |
| 9,557,922 B2 | 1/2017 | McCambridge et al. | |
| 9,898,312 B2 * | 2/2018 | Chamberlain | G06F 16/2455 |
| 10,223,314 B2 | 3/2019 | Kollu | |
| 10,817,446 B1 * | 10/2020 | Saxena | G06F 13/1673 |

(Continued)

FOREIGN PATENT DOCUMENTS

WO    WO-2013065687 A1 *    5/2013    ......... G06F 9/30087

*Primary Examiner* — Idriss N Alrobaye
*Assistant Examiner* — Ronald T Modo
(74) *Attorney, Agent, or Firm* — Volentine, Whitt & Francos, PLLC

(57) ABSTRACT

A computing system includes a host, a first electronic device including a memory and an accelerator, and a second electronic device including a direct memory access (DMA) engine. Based on a command transmitted from the host through the first electronic device, the DMA engine transmits data and completion information of the command to the first electronic device. The memory includes a data buffer storing the data and a completion queue buffer storing the completion information. The accelerator executes a calculation on the data. The DMA engine transmits the data to the first electronic device and then transmits the completion information to the first electronic device.

20 Claims, 13 Drawing Sheets

(56) References Cited

U.S. PATENT DOCUMENTS

| | | | |
|---|---|---|---|
| 2008/0183882 A1* | 7/2008 | Flynn | G06F 3/0659 |
| | | | 709/229 |
| 2017/0249276 A1* | 8/2017 | Kim | G06F 11/1004 |
| 2018/0107614 A1 | 4/2018 | Hong et al. | |
| 2018/0113615 A1 | 4/2018 | Park | |
| 2019/0187774 A1 | 6/2019 | Yi et al. | |

* cited by examiner

COMPUTING SYSTEM FOR TRANSMITTING COMPLETION EARLY BETWEEN SERIALLY CONNECTED ELECTRONIC DEVICES

CROSS-REFERENCE TO RELATED APPLICATIONS

This application claims priority under 35 U.S.C. § 119 to Korean Patent Application No. 10-2020-0007182 filed on Jan. 20, 2020, in the Korean Intellectual Property Office, the disclosure of which is incorporated by reference herein in its entirety.

BACKGROUND

Embodiments of the disclosure described herein relate to a computing system, and more particularly, relate to a computing system for transmitting a completion early between serially connected electronic devices.

In a computing system, a plurality of electronic devices may be interconnected and communicate with each other. A bus of the computing system may interconnect the plurality of electronic devices of the computing system. The plurality of electronic devices may be connected serially or sequentially. The serially connected electronic devices may communicate with a host of the computing system.

An electronic device corresponding to an endpoint device from among the plurality of electronic devices may communicate with the host through at least one or more electronic devices. A communication speed between the endpoint device and the host may become slow due to a latency of the at least one or more electronic devices placed between the endpoint device and the host. In particular, in the case where the endpoint device is a high-speed electronic device, the latency may become more serious.

SUMMARY

Embodiments of the disclosure provide a computing system for transmitting a completion signal early between serially connected electronic devices.

According to an exemplary embodiment, a computing system includes a host, a first electronic device including a memory and an accelerator, and a second electronic device including a direct memory access (DMA) engine. Based on a command transmitted from the host through the first electronic device, the DMA engine transmits data and completion information of the command to the first electronic device. The memory includes a data buffer storing the data and a completion queue buffer storing the completion information. The accelerator executes a calculation on the data. The DMA engine transmits the data to the first electronic device and then transmits the completion information to the first electronic device.

According to an exemplary embodiment, a computing system includes a host, a first electronic device that communicates with the host, and a second electronic device that communicates with the host through the first electronic device. The first electronic device includes a memory that includes a data buffer receiving data from the second electronic device. The second electronic device receives a command from the host through the first electronic device. The first electronic device also includes: (1) a completion queue buffer that receives completion information about the command from the second electronic device, (2) an accelerator that executes a calculation on the data stored in the memory, and (3) an interface circuit that transmits the completion information stored in the completion queue buffer to the host when the calculation is completely executed by the accelerator.

According to an exemplary embodiment, a computing system includes a host that manages a submission queue of a host memory buffer, in which a command is written, and a completion queue of the host memory buffer, in which completion information about the command is written. The computing system also includes a first electronic device that includes a memory and an accelerator. The memory includes a data buffer storing data requested by the command and a completion queue buffer storing the completion information. The accelerator executes a calculation on the data. The computing system further includes a second electronic device that fetches the command through the first electronic device and transmits the data and the completion information to the first electronic device based on the command.

BRIEF DESCRIPTION OF THE FIGURES

The above and other objects and features of the disclosure will become apparent by describing in detail exemplary embodiments thereof with reference to the accompanying drawings.

DETAILED DESCRIPTION

Below, embodiments of the disclosure will be described in detail and clearly to such an extent that one of ordinary skill in the art easily implements the disclosure.

Figure 1:
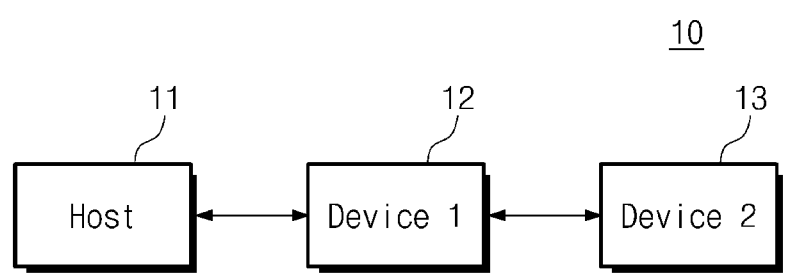
FIG. 1 illustrates a block diagram of a computing system according to an exemplary embodiment of the disclosure.

FIG. 1 illustrates a block diagram of a computing system according to an exemplary embodiment of the disclosure. A computing system 10 may include a host 11, a first electronic device 12, and a second electronic device 13. For example, the computing system 10 may be implemented on various electronic devices, such as a desktop computer, a laptop computer, a tablet computer, a video game console, a workstation, a server, a computing device, and a mobile device, or on a main board of an electronic device.

The host 11 may manage and process overall operations of the computing system 10. For example, the host 11 may include a general-purpose processor, a special-purpose processor, or an application processor. The host 11 may be a processor itself, or the host 11 may be an electronic device or a system including a processor.

The first electronic device 12 may be connected with the host 11 directly or serially (or sequentially). The second electronic device 13 may be connected with the first electronic device 12 directly or serially. For example, the host 11, the first electronic device 12, and the second electronic device 13 may be connected in a chain manner. The second electronic device 13 may be connected with the host 11 through the first electronic device 12. For example, the host 11 may directly communicate with the first electronic device 12 and may communicate with the second electronic device 13 through the first electronic device 12. For example, the second electronic device 13 may correspond to an endpoint device, and the first electronic device 12 may be an intermediate device connecting the host 11 and the endpoint device.

Unlike the example illustrated in FIG. 1, one or more electronic devices may be further connected between the host 11 and the first electronic device 12, and one or more electronic devices may be further connected between the first electronic device 12 and the second electronic device 13. For example, the first electronic device 12 and the second electronic device 13 may be implemented to be identical or different. For another example, the first electronic device 12 may correspond to a switch or a switch device connecting the host 11 and the second electronic device 13, and the second electronic device 13 may correspond to an endpoint device, not a switch. For another example, although not illustrated in FIG. 1, the computing system 10 may further include a third electronic device capable of communicating with the host 11 through the first and second electronic devices 12 and 13.

For example, each of the host 11, the first electronic device 12, and the second electronic device 13 may be implemented with a system on chip (SoC), an application specific integrated circuit (ASIC), a field programmable gate array (FPGA), a storage device, a solid state drive (SSD), a peripheral component interconnect express (PCIe) device, a nonvolatile memory express (NVMe) device, a universal flash storage (UFS) device, a universal serial bus (USB) device, etc., but the disclosure is not limited to the above examples.

Figure 2:
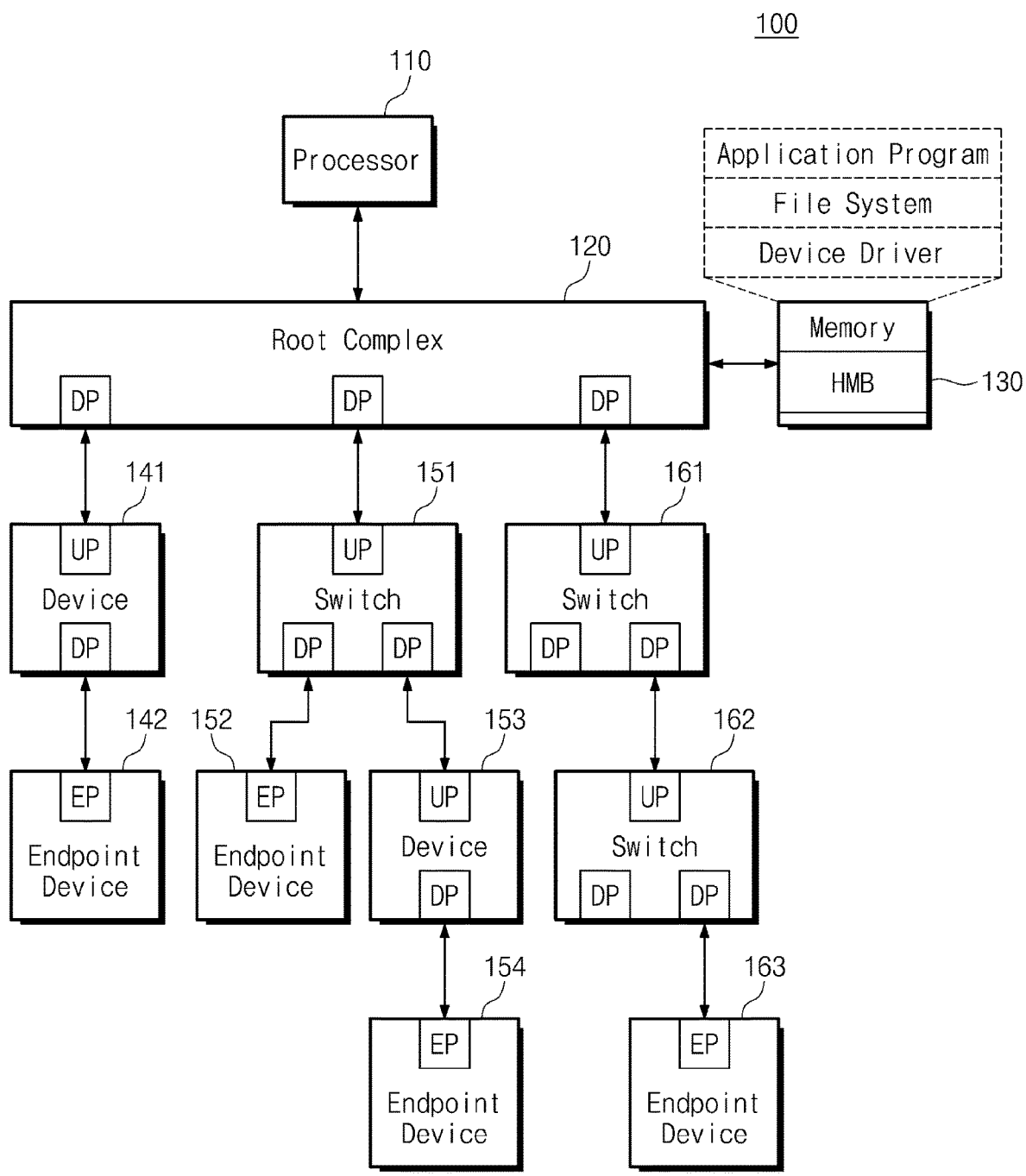
FIG. 2 illustrates a block diagram of a computing system of FIG. 1 in detail.

FIG. 2 illustrates a block diagram of a computing system of FIG. 1 in detail. A computing system 100 may correspond to an example of the computing system 10 of FIG. 1. The computing system 100 may include a processor 110, a root complex 120, a memory 130, and electronic devices 141, 142, 151 to 154, and 161 to 163. Here, an electronic device may be also referred to as an "input/output (I/O) device".

The processor 110 may perform various kinds of arithmetic operations or logical operations. For example, the processor 110 may include at least one or more cores (e.g., a homogeneous multi-core or a heterogeneous multi-core), which perform the above operations, and an internal cache memory. The processor 110 may execute a program code, software, an application program, firmware, etc. loaded onto the memory 130.

The root complex 120 may mediate communication between the processor 110, the memory 130, and the electronic devices 141, 142, 151 to 154, and 161 to 163. For example, the root complex 120 may manage a communication timing, a communication sequence, a communication environment, etc. between the processor 110, the memory 130, and the electronic devices 141, 142, 151 to 154, and 161 to 163. The root complex 120 may be implemented in a hardware manner, a software manner, or a combination thereof and may be mounted on a main board of the computing system 100. The root complex 120 may be a root that connects the processor 110 and the memory 130 to an I/O hierarchy including the electronic devices 141, 142, 151 to 154, and 161 to 163. The root complex 120 may include one or more downstream ports DP, the electronic devices 141 and 142 may be connected with the downstream port DP of the root complex 120, the electronic devices 151 to 154 may be connected with the downstream port DP of the root complex 120, and the electronic devices 161 to 163 may be connected with the downstream port DP of the root complex 120. The number of downstream ports DP is not limited to the example illustrated in FIG. 2. The number of electronic devices connected with each of the downstream ports DP may be one or more.

In an exemplary embodiment, the communication between the root complex 120 and the electronic devices 141, 142, 151 to 154, and 161 to 163 may be performed in compliance with various interface protocols such as a peripheral component interconnect express (PCIe) protocol, a mobile PCIe (M-PCIe) protocol, a nonvolatile memory express (NVMe) protocol, a universal serial bus (USB) protocol, a small computer system interface (SCSI) protocol, an advanced technology attachment (ATA) protocol, a parallel ATA (PATA), a serial ATA (SATA), a serial attached SCSI (SAS) protocol, an integrated drive electronics (IDE) protocol, a universal flash storage (UFS) protocol, and a Firewire protocol.

The memory 130 may temporarily store data that are used for an operation of the computing system 100. The memory 130 may store data processed or to be processed by the processor 110. For example, the memory 130 may include a volatile memory such as a static random access memory (SRAM), a dynamic RAM (DRAM), a thyristor RAM (TRAM), or a nonvolatile memory. An application program, a file system, or a device driver that is executable by the processor 110 may be loaded onto the memory 130. A program and a software layer that are loaded onto the memory 130 are not limited to the example illustrated in FIG. 2. The memory 130 may include a host memory buffer HMB. A portion of the whole storage area of the memory 130 may be allocated to the host memory buffer HMB.

For example, the processor 110 may correspond to the host 11 of FIG. 1. For another example, the processor 110 and the root complex 120 may correspond to the host 11 of FIG. 1. For another example, the processor 110, the root complex 120, and the memory 130 all may correspond to the host 11 of FIG. 1. The processor 110, the root complex 120, and the memory 130 may be implemented with one chip to constitute the host 11. Alternatively, the processor 110, the root complex 120, and the memory 130 may be implemented with one or more chips to constitute the host 11.

Each of the electronic devices 142, 152, 154, and 163 may correspond to an endpoint device. Each of the electronic devices 142, 152, 154, and 163 may include an end point port EP. Each of the remaining electronic devices 141, 151, 153, 161, and 162 may correspond to an intermediate device connecting the root complex 120 and an endpoint device. Each of the electronic devices 141, 151, 153, 161, and 162 may include an upstream port UP and a downstream port DP. For example, the upstream port UP may be closer to the root complex 120 than the downstream port DP. The end point port EP of an endpoint device may be connected with the downstream port DP of an intermediate device or the root complex 120. The end point port EP may be also referred to as the "upstream port UP". For example, one of the electronic devices 141, 151, 153, 161, and 162 may correspond to the first electronic device 12 of FIG. 1, and one of the electronic devices 142, 152, 154, and 163 may correspond to the second electronic device 13 of FIG. 1.

In an exemplary embodiment, the electronic devices 141, 151, 153, 161, and 162 corresponding to the first electronic device 12 of FIG. 1 may be an FPGA, a PCIe switch, a PCIe device, an NVMe device, a storage device, a solid state drive (SSD), etc. The electronic devices 142, 152, 154, and 163 corresponding to the second electronic device 13 of FIG. 1 may also be an FPGA, a PCIe switch, a PCIe device, an NVMe device, a storage device, an SSD, etc. As described above, any other endpoint devices (not illustrated) connected with the electronic devices 142, 152, 154, and 163 may be further included in the computing system 100.

For example, an electronic device corresponding to an FPGA from among the electronic devices 141, 151, 153, 161, and 162 may assist an operation or a calculation of the processor 110. The electronic device being the FPGA may execute a calculation on read data transmitted from one electronic device among the electronic devices 142, 152, 154, and 163, may transmit a calculation result to the root complex 120, and may assist a calculation of the processor 110. The electronic device being the FPGA may execute a calculation on write data transmitted from the root complex 120, may transmit a calculation result to any other electronic device, and may assist a calculation of the processor 110.

Figure 3:
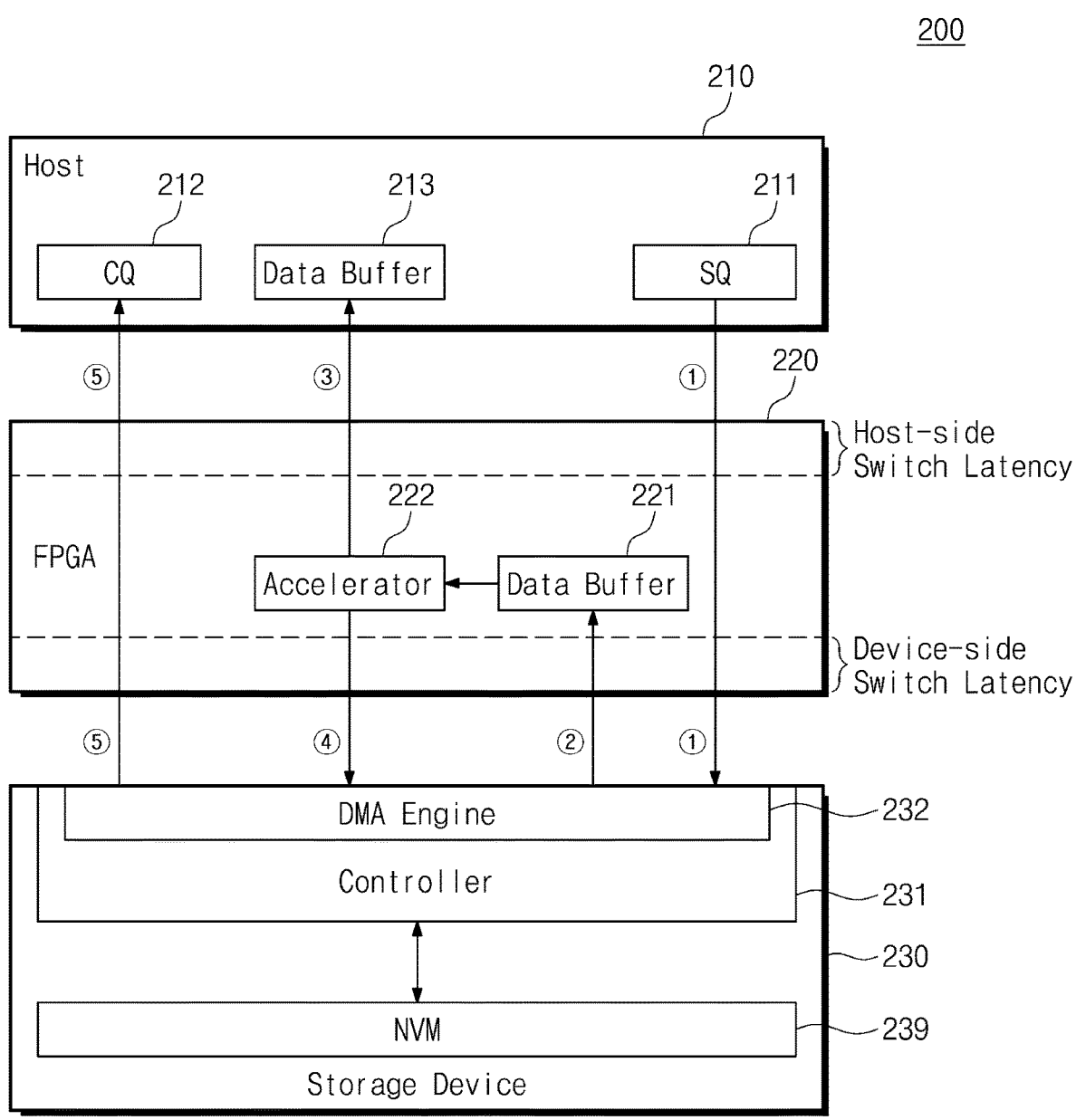
FIG. 3 illustrates a block diagram of a computing system of FIG. 1.
Figure 4:
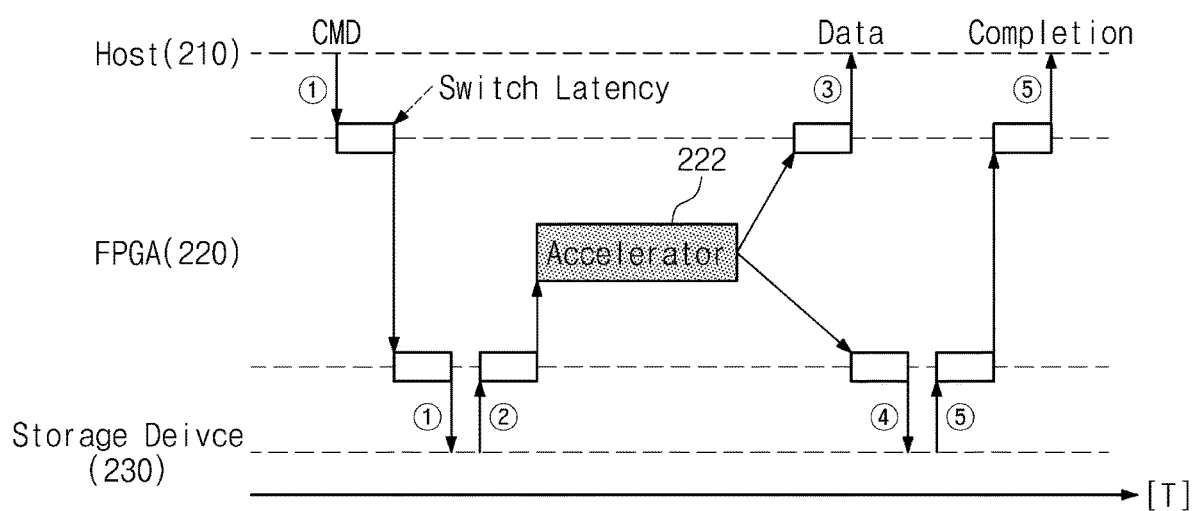
FIG. 4 illustrates an operation timing of a computing system of FIG. 3.

FIG. 3 illustrates a block diagram of a computing system of FIG. 1. FIG. 4 illustrates an operation timing of a computing system of FIG. 3. A computing system 200 may include a host 210, an FPGA 220, and a storage device 230. For example, the computing system 200, the host 210, the FPGA 220, and the storage device 230 may correspond to the computing system 100, the host 11, the first electronic device 12, and the second electronic device 13 of FIG. 1, respectively.

The host 210 may include a submission queue (SQ) 211, a completion queue (CQ) 212, and a data buffer 213. The submission queue 211, the completion queue 212, and the data buffer 213 may be placed or implemented on the host memory buffer HMB of FIG. 2 and may occupy partial areas of the host memory buffer HMB. The host 210 may perform input/output operations on the storage device 230 through the FPGA 220, based on a pair of the submission queue 211 and the completion queue 212.

The FPGA 220 may be placed between the host 210 and the storage device 230 and may transmit electrical signals from the host 210 (or the storage device 230) to the storage device 230 (or the host 210). The FPGA 220 may include a data buffer 221 and an accelerator 222. The data buffer 221 may store data that are exchanged between the host 210 and the storage device 230. The accelerator 222 may execute various kinds of arithmetic operations or calculations on data stored on the data buffer 221.

The storage device 230 may receive commands (or requests) of the host 210, may process the received commands, and may transmit the processed result to the host 210. The storage device 230 may include a nonvolatile memory 239 and a controller 231 to control the nonvolatile memory 239. For example, the nonvolatile memory 239 may include a NAND flash memory, a NOR flash memory, a phase change RAM (PRAM), a magnetic RAM (MRAM), a resistive RAM (RRAM), a ferroelectric RAM (FeRAM), etc. The controller 231 may include a direct memory access (DMA) engine 232 configured to directly transmit a request or data to the FPGA 220 or the host 210.

The host 210 may input or write a command for the storage device 230 in an entry (or a slot) of the submission queue 211 and may update a tail pointer of the submission queue 211, that is, a doorbell associated with the submission queue 211. For example, the doorbell may include an address indicating the submission queue 211. For example, the pair of the submission queue 211 and the completion queue 212 may be provided for each core of the processor 110, and the number of pairs may be one or more. The host 210 may submit or transmit the doorbell associated with the submission queue 211 to the storage device 230 through the FPGA 220. The host 210 may update a doorbell register of the controller 231 of the storage device 230 by transmitting the doorbell. The storage device 230 may read the doorbell stored in the doorbell register and may determine that a command is input or written in the submission queue 211 by the host 210. The storage device 230 may fetch or read the command of the submission queue 211 of the host 210 based on the doorbell. The storage device 230 may request the command of the submission queue 211 of the host 210 and may transmit the request to the host 210 through the FPGA 220. Next, the storage device 230 may read or receive the command of the submission queue 211 through the FPGA 220 from the host 210 (①).

The DMA engine 232 of the storage device 230 may receive the command from the FPGA 220 when switch latencies of the FPGA 220 elapse and may store the received command in a memory (refer to 631_2 or 638 of FIG. 12) associated with the controller 231. A latency may be also referred to as a "time". For example, the whole latency of the FPGA 220 may be divided into a host-side switch latency and a storage device-side switch latency. In detail, the FPGA 220 may include a transmission path including one or more transmission circuits for transmitting a command and physical paths in the FPGA 220. For example, a time taken for the command to pass through a portion of the transmission path of the FPGA 220 may correspond to the host-side switch latency, and a time taken to the command to pass through the remaining portion of the transmission path of the FPGA 220 may correspond to the storage device-side switch latency. As in the above command transmission (①), the switch latencies may occur even in the case of transmitting a request for a command or transmitting a doorbell indicating that a command is written in the submission queue 211.

The controller 231 of the storage device 230 may receive the command transmitted from the host 210 through the FPGA 220 (①) and may process the received command. For example, the command may be a read command. The controller 231 may decode the command, and the DMA engine 232 may transmit data requested by the command to the FPGA 220 (②). The data requested by the command may correspond to data stored in the nonvolatile memory 239 or data stored in any other memory (refer to 631_2 or 638 of FIG. 12).

When a switch latency elapses after the read data are transmitted from the storage device 230 to the FPGA 220 (②), the read data may arrive at the data buffer 221, that is, may be stored in the data buffer 221. The accelerator 222 may execute a calculation on the read data stored in the data buffer 221. When the calculation is completely executed by the accelerator 222, the accelerator 222 may transmit one of the read data and calculated data generated by the accelerator 222 to the host 210 (③). When a switch latency elapses after one of the calculated data and the read data is transmitted to the host 210, the one of the calculated data and the read data may arrive at the host 210 (③). Also, the accelerator 222 may transmit, to the storage device 230, a signal (or a notification signal) indicating that the calculation is completely executed by the accelerator 222 (④). When a switch latency elapses after the signal indicating that the calculation is completely executed by the accelerator 222 is transmitted, the signal may arrive at the DMA engine 232 of the storage device 230 (④). For example, as illustrated in FIG. 4, the accelerator 222 may transmit one of the calculated data and the read data to the host 210 (③) and may then transmit, to the storage device 230, the signal indicating that the calculation is completely executed by the accelerator 222 (④). For another example, unlike the example illustrated in FIG. 4, the accelerator 222 may transmit one of the calculated data and the read data to the host 210 and simultaneously may transmit, to the storage device 230, the signal indicating that the calculation is completely executed by the accelerator 222. In any case, after the calculation of the accelerator 222 is completed, the FPGA 220 may transmit, to the storage device 230, the signal indicating that the calculation is completely executed by the accelerator 222.

The controller 231 may receive the signal (④) and may check, through the signal, that the read data are completely calculated by the accelerator 222 and the command of the host 210 is processed. The DMA engine 232 may transmit completion information (or a completion) about the command to the host 210 through the FPGA 220 (⑤). For example, the completion information may include whether a command is completed, a result of processing the command, etc. When a switch latency elapses after the completion information is transmitted from the storage device 230 to the FPGA 220 (⑤), the completion information may arrive at the completion queue 212 of the host 210 (⑤). As in the above command transmission, switch latencies may occur even in the case of transmitting the completion information (⑤). Embodiments of the disclosure may provide various computing systems 300, 400, and 1000 for improving a time or a latency necessary to completely process a command (or a time or a latency necessary to receive completion information of a command), due to switch latencies occurring due to the FPGA 220 placed between the host 210 and the storage device 230.

Figure 5:
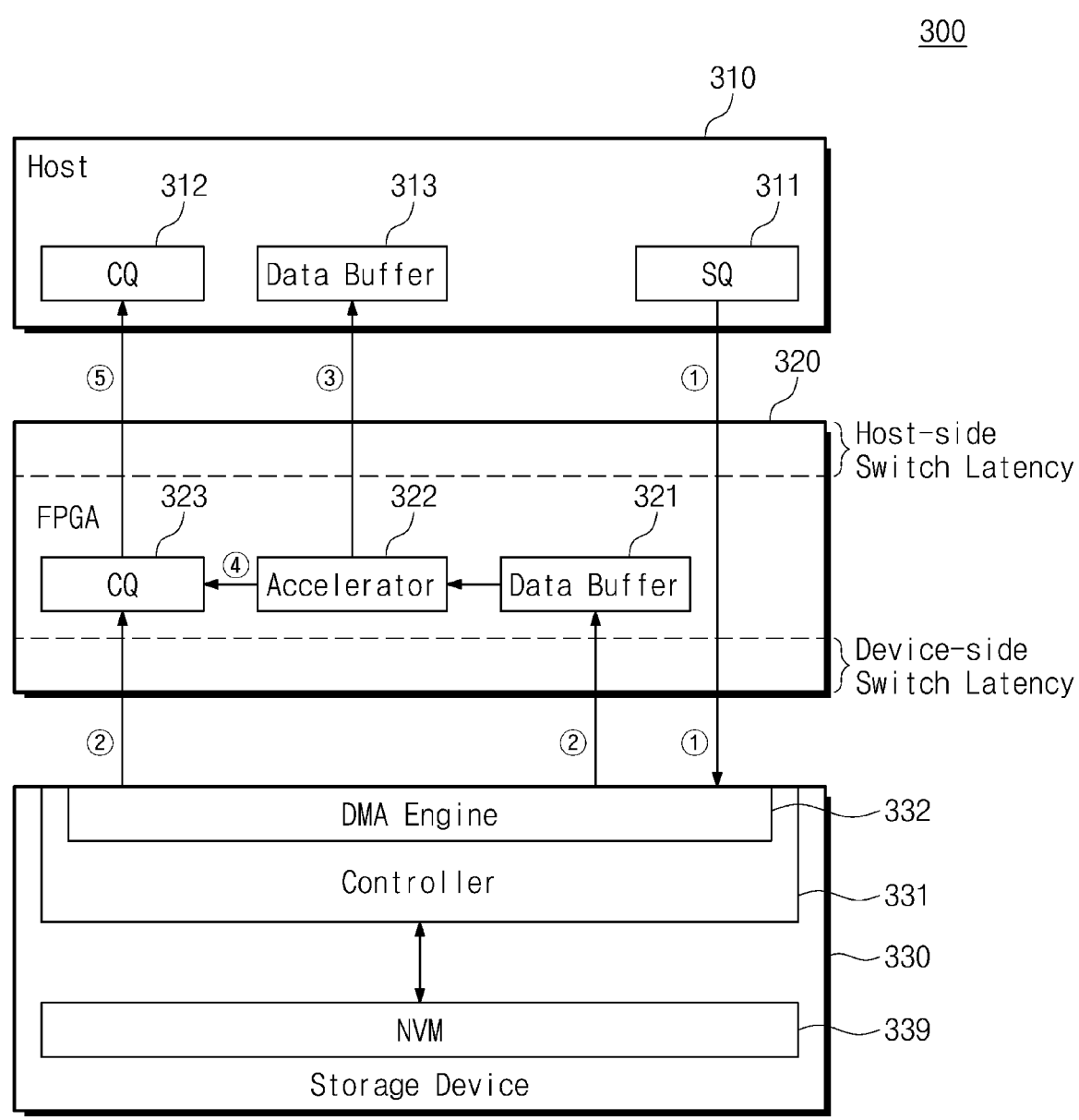
FIG. 5 illustrates a block diagram of a computing system of FIG. 1.
Figure 6:
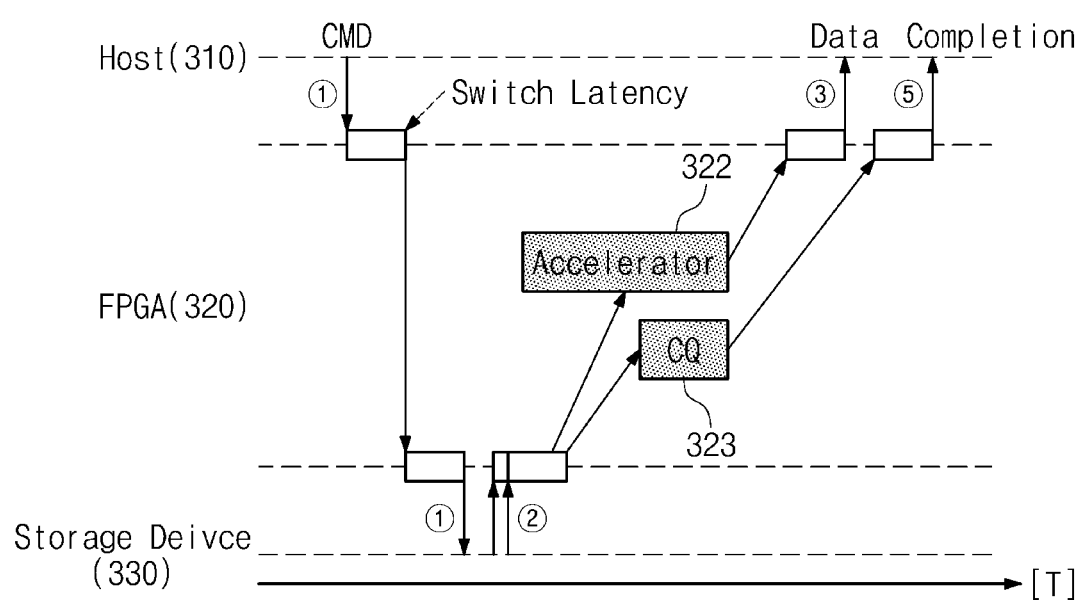
FIG. 6 illustrates an operation timing of a computing system of FIG. 5.
Figure 7:
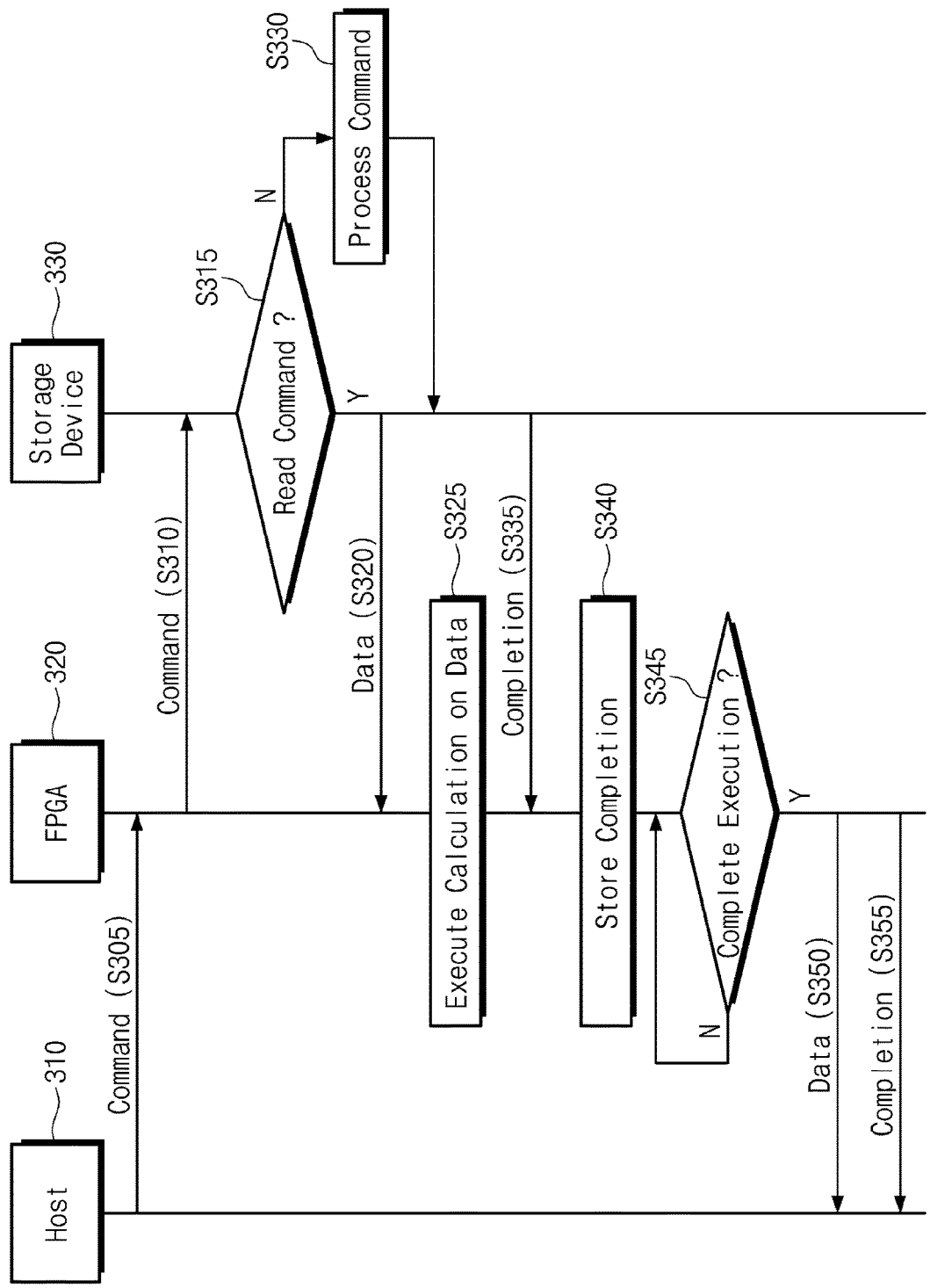
FIG. 7 illustrates an operating method of a computing system of FIG. 5.

FIG. 5 illustrates a block diagram of a computing system of FIG. 1. FIG. 6 illustrates an operation timing of a computing system of FIG. 5. FIG. 7 illustrates an operating method of a computing system of FIG. 5.

A computing system 300 may include a host 310, an FPGA 320, and a storage device 330. The host 310 may include a submission queue 311, a completion queue 312, and a data buffer 313. The components 311 to 313 of the host 310 may be similar to the components 211 to 213 of the host 210, respectively. The FPGA 320 may include a data buffer 321 and an accelerator 322. The components 321 and 322 of the FPGA 320 may be similar to the components 211 and 212 of the FPGA 220, respectively. Compared to the FPGA 220, the FPGA 320 may further include a completion queue buffer 323. For example, the completion queue buffer 323 of the FPGA 320 may correspond to a copy or mirroring of the completion queue 312 of the host 310. The completion queue buffer 323 may be similar to the completion queue 312. The storage device 330 may include a controller 331 and a nonvolatile memory 339. The controller 331 may include a DMA engine 332. The components 331, 332, and 339 of the storage device 330 may be similar to the components 231, 232, and 239 of the storage device 230, respectively. A description will be focused on a difference between the computing system 300 and the computing system 200.

The host 310 may write or store a command associated with the storage device 330 in the submission queue 311. The host 310 may transmit a doorbell associated with the submission queue 311 to the FPGA 320, and the FPGA 320 may receive the doorbell. The FPGA 320 may transmit the doorbell to the storage device 330. Based on the doorbell, the storage device 330 may request the command of the submission queue 311 of the host 310 and may transmit the request to the FPGA 320. The FPGA 320 may transmit the request to the host 310. For example, the storage device 330 may access the submission queue 311, which an address of the doorbell indicates, from among one or more submission queues of the host 310.

In operation S305, the host 310 may receive the request and may transmit the command of the submission queue 311 to the FPGA 320 (①). When a switch latency elapses after the command of the submission queue 311 is transmitted from the host 310 to the FPGA 320, the FPGA 320 may receive the command of the submission queue 311 from the host 310 (①). In operation S310, the FPGA 320 may transmit the command of the submission queue 311 to the storage device 330. When a switch latency elapses after the command of the submission queue 311 is transmitted from the FPGA 320 to the storage device 330, the DMA engine 332 of the storage device 330 may receive the command of the submission queue 311 (①). That is, the storage device 330 may fetch the command of the submission queue 311. In operation S315, the controller 331 may determine whether the command of the submission queue 311 is a read command.

When the command of the submission queue 311 is the read command (Y), in operation S320, the DMA engine 332 may transmit data requested by the read command to the FPGA 320 based on the command in operation S310 (②). When a switch latency elapses after the data are transmitted from the storage device 330 to the FPGA 320, the FPGA 320 may store the data in the data buffer 321. In operation S325, the accelerator 322 may execute a calculation on the data stored in the data buffer 321. For example, the host 310 may in advance request a kind of a calculation to be executed by the accelerator 322 of the FPGA 320. For another example, a kind of a calculation to be executed by the accelerator 322 may be in advance determined and fixed.

When the command of the submission queue 311 is not the read command (N), in operation S330, the controller 331 may process the command. For example, when the command of the submission queue 311 is a write command, the DMA engine 332 may receive data stored in the data buffer 313 of the host 310 through the FPGA 320, and the controller 331 may store the data in the nonvolatile memory 339. As in the above description, the controller 331 may perform operations corresponding to the command in operation S310.

In operation S320 or operation S330, the controller 331 may process the command communicated in operation S310. In operation S335, the DMA engine 332 may transmit completion information about the command to the FPGA 320 based on the command received in operation S310 (②). When a switch latency elapses after the completion information is transmitted from the storage device 330 to the FPGA 320, the FPGA 320 may store, in operation S340, the completion information in the completion queue buffer 323. Unlike the computing system 200 described above, the FPGA 320 of the computing system 300 may include or support the completion queue buffer 323. Accordingly, after the command in operation S310 is completely processed in operation S320 or operation S330, the storage device 330 may transmit, in operation S335, the completion information to the FPGA 320 before the calculation is completed by the accelerator 322 (②). For example, when the command in operation S310 is the read command, the DMA engine 332 may transmit data to the FPGA 320 in operation S320 (②) and then may transmit the completion information to the FPGA 320 (②) in operation S335. The DMA engine 332 may transmit the completion information, in operation S335, to the FPGA 320 only depending on whether the command in operation S310 is processed, regardless of the operation of the FPGA 320 (e.g., the calculation executed by the accelerator 322). Accordingly, compared to the storage device 230, the storage device 330 may transmit the completion information in operation S335 early (②). Unlike the storage device 230, the storage device 330 may transmit the completion information in operation S335 to the FPGA 320 without receiving a signal indicating that the calculation executed by the accelerator 322 is completed (②).

When it is determined in operation S345 that the calculation executed by the accelerator 322 is not completed (N), the FPGA 320 may wait until the calculation executed by the accelerator 322 is completed. When it is determined in operation S345 that the calculation executed by the accelerator 322 is completed (Y), in operation S350, the FPGA 320 may transmit data to the host 310 (③). When a switch latency elapses after the data are transmitted from the FPGA 320 to the host 310, the host 310 may store the data in the data buffer 313. Here, the data may be calculated data that is generated by the accelerator 322 or read data that is read from the storage device 330. For another example, the FPGA 320 may transmit both the calculated data that is generated by the accelerator 322 and the read data that is read from the storage device 330 to the host 310.

The accelerator 322 may complete the calculation and may control the completion queue buffer 323 (④). The accelerator 322 may access the completion queue buffer 323 with reference to an address of the completion queue buffer 323 placed on an on-chip memory and an identifier ID of a command. The completion information that is transmitted from the storage device 330 may include an identifier of a command. For example, the identifier of the command may be allocated by the host 310 when the command is submitted to the submission queue 311. The FPGA 320 may not transmit, to the storage device 330, a signal indicating that the calculation of the accelerator 322 is completed. In operation S355, the FPGA 320 may transmit the completion information stored in the completion queue buffer 323 to the host 310 (⑤). For example, when the calculation executed by the accelerator 322 is completed, the FPGA 320 may transmit the completion information stored in the completion queue buffer 323 to the host 310. When a switch latency elapses after the completion information is transmitted from the FPGA 320 to the host 310, the host 310 may receive the completion information and may store the completion information in the completion queue 312.

In an exemplary embodiment, the DMA engine 332 may perform operation S320 or operation S330 and then may perform operation S335. As in the above description, the FPGA 320 may perform operation S350 and then may perform operation S355. The order of performing operation S325, operation S335, and operation S340 is not limited to the example illustrated in FIG. 7. For example, while the accelerator 322 executes a calculation on data, the DMA engine 332 may transmit completion information about a command to the FPGA 320. The completion queue buffer 323 may store the completion information about the command while the accelerator 322 executes the calculation on the data.

In an exemplary embodiment, the components 321 to 323 of the FPGA 320 may be implemented in a hardware manner, in a software manner, or in a combination thereof. In the case of using the hardware manner, the components 321 to 323 may be variously implemented by using a register, a latch, a flip-flop, a logic circuit, a logic gate, etc. The data buffer 321 and the completion queue buffer 323 may correspond to areas allocated on the on-chip memory included in the FPGA 320. In an exemplary embodiment, the controller 331 may be implemented in a hardware manner, in a software manner, or in a combination thereof.

Figure 8:
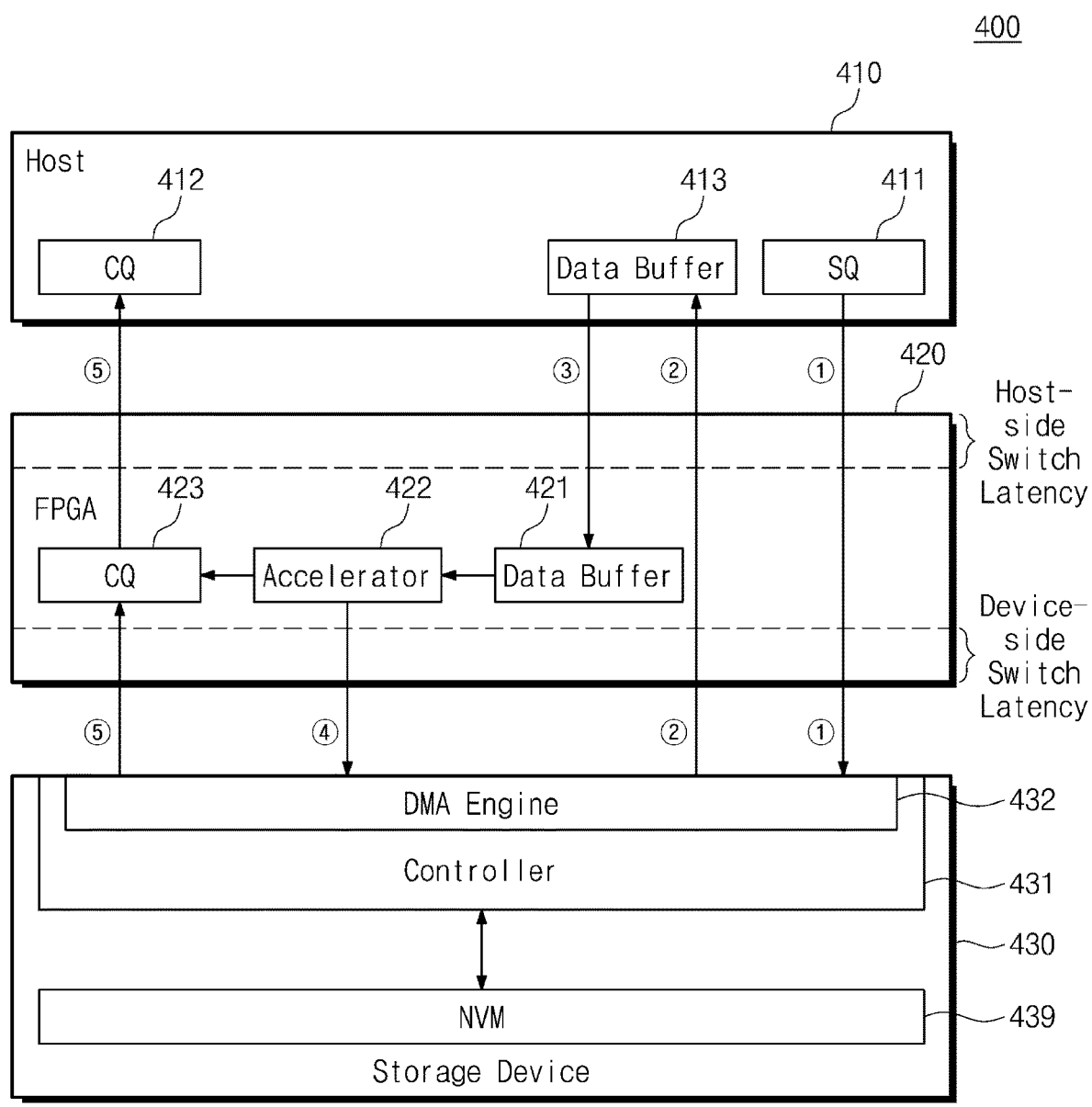
FIG. 8 illustrates a block diagram of a computing system of FIG. 1.
Figure 9:
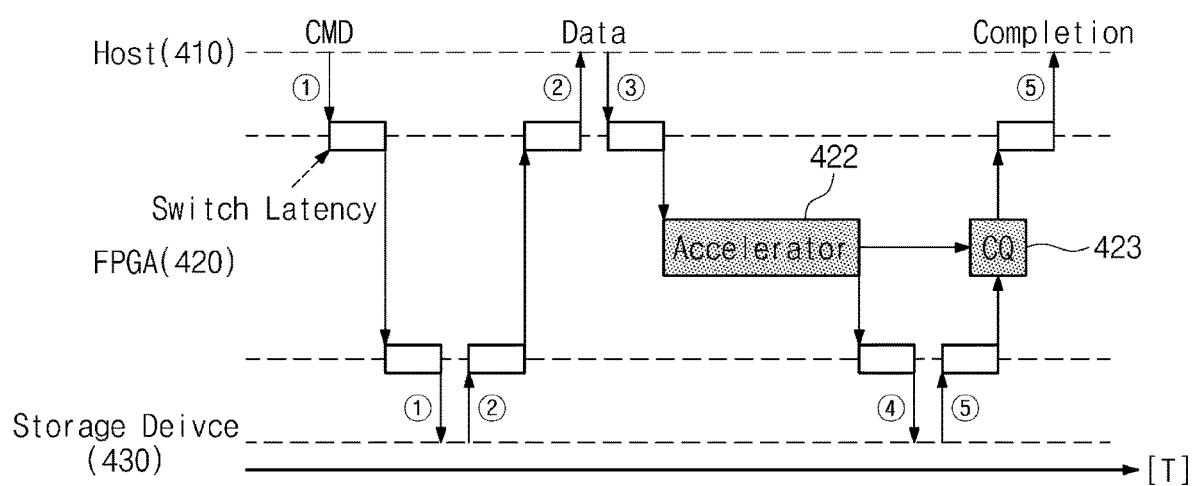
FIG. 9 illustrates an operation timing of a computing system of FIG. 8.
Figure 10:
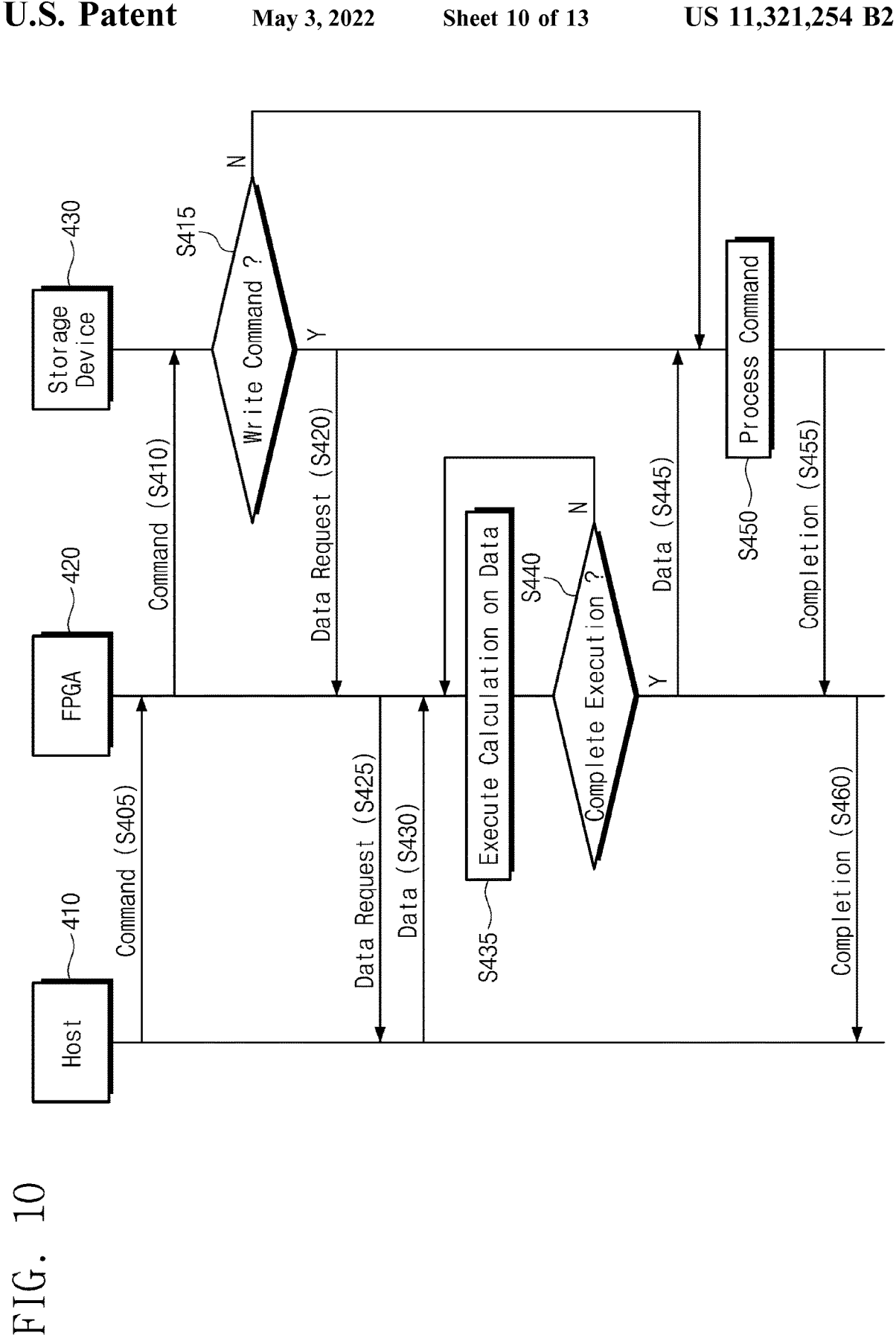
FIG. 10 illustrates an operating method of a computing system of FIG. 8.

FIG. 8 illustrates a block diagram of a computing system of FIG. 1. FIG. 9 illustrates an operation timing of a computing system of FIG. 8. FIG. 10 illustrates an operating method of a computing system of FIG. 8.

A computing system 400 may include a host 410, an FPGA 420, and a storage device 430. The host 410 may include a submission queue 411, a completion queue 412, and a data buffer 413. The components 411 to 413 of the host 410 may be similar to the components 311 to 313 of the host 310, respectively. The FPGA 420 may include a data buffer 421, an accelerator 422, and a completion queue buffer 423. The components 421 to 423 of the FPGA 420 may be similar to the components 321 to 323 of the FPGA 320, respectively. The storage device 430 may include a controller 431 and a nonvolatile memory 439. The controller 431 may include a DMA engine 432. The components 431, 432, and 439 of the storage device 430 may be similar to the components 331, 332, and 339 of the storage device 330, respectively. A description will be focused on a difference between the computing system 400 and the computing system 300.

The host 410 may write or store a command associated with the storage device 430 in the submission queue 411. The host 410 may transmit a doorbell associated with the submission queue 411 to the FPGA 420, and the FPGA 420 may receive the doorbell. The FPGA 420 may transmit the doorbell to the storage device 430. Based on the doorbell, the storage device 430 may request the command of the submission queue 411 of the host 410 and may transmit the request to the FPGA 420. The FPGA 420 may transmit the request to the host 410. For example, the storage device 430 may access the submission queue 411, which an address of the doorbell indicates, from among one or more submission queues of the host 410.

In operation S405, the host 410 may receive the request and may transmit the command of the submission queue 411 to the FPGA 420 (①). When a switch latency elapses after the command of the submission queue 411 is transmitted from the host 410 to the FPGA 420, the FPGA 420 may receive the command of the submission queue 411 from the host 410 (①). In operation S410, the FPGA 420 may transmit the command of the submission queue 411 to the storage device 430. When a switch latency elapses after the command of the submission queue 411 is transmitted from the FPGA 420 to the storage device 430, the DMA engine 432 of the storage device 430 may receive the command of the submission queue 411 (①). In operation S415, the controller 431 may determine whether the command of the submission queue 411 is a write command.

When the command of the submission queue 411 is the write command (Y), in operation S420, the DMA engine 432 may transmit a data request to the FPGA 420 based on the write command (②). When a switch latency elapses after the data request is transmitted from the storage device 430 to the FPGA 420, the FPGA 420 may receive the data request (②). In operation S425, the FPGA 420 may transmit the data request to the host 410 (②). When a switch latency elapses after the data request is transmitted from the FPGA 420 to the host 410, the host 410 may receive the data request (②). In operation S430, the host 410 may transmit write data of the data buffer 413 to the FPGA 420 based on the data request (③). When a switch latency elapses after the write data are transmitted from the host 410 to the FPGA 420, the FPGA 420 may receive the write data and may store the write data in the data buffer 421.

In operation S435, the accelerator 422 may execute a calculation on the write data stored in the data buffer 421. For example, the host 410 may in advance request a kind of a calculation to be executed by the accelerator 422 from the FPGA 420. For another example, a kind of a calculation to be executed by the accelerator 422 may be in advance determined and fixed. The accelerator 422 may complete the calculation and may control the completion queue buffer 423. The accelerator 422 may access the completion queue buffer 423 with reference to an address of the completion queue buffer 423 placed on an on-chip memory and an identifier ID of a command. Completion information that is transmitted from the storage device 430 may include an identifier of a command. The identifier of the command may be allocated by the host 410 when the command is submitted to the submission queue 411. When it is determined in operation S440 that the calculation executed by the accelerator 422 is not completed (N), the FPGA 420 may wait until the calculation executed by the accelerator 422 is completed. When it is determined in operation S440 that the calculation executed by the accelerator 422 is completed (Y), in operation S445, the FPGA 420 may transmit one of calculated data generated by the accelerator 422 and the write data to the storage device 430 (④). When a switch latency elapses after the one of the calculated data generated by the accelerator 422 and the write data is transmitted from the FPGA 420 to the storage device 430, the DMA engine 432 may receive the one of the calculated data and the write data (④).

When the command of the submission queue 411 is not the write command (N), in operation S450, the controller 431 may process the command without operation S420 to operation S445. The controller 431 may perform operations corresponding to the command received in operation S410. As described above, when the command of the submission queue 411 is the write command, the DMA engine 432 may receive data stored in the data buffer 413 of the host 410 through the FPGA 420, and the controller 431 may store the data in a storage space (e.g., an on-chip memory 631_2 (refer to FIG. 12), a memory buffer 638 (refer to FIG. 12), or the nonvolatile memory 439) present in the storage device 430.

In operation S450, the controller 431 may process the command received in operation S410. In operation S455, the DMA engine 432 may transmit completion information about the command to the FPGA 420 (⑤). When a switch latency elapses after the completion information is transmitted from the storage device 430 to the FPGA 420, the FPGA 420 may receive the completion information and may store the completion information in the completion queue buffer 423 (⑤). In operation S460, the FPGA 420 may transmit the completion information stored in the completion queue buffer 423 to the host 410. When a switch latency elapses after the completion information is transmitted from the FPGA 420 to the host 410, the host 410 may receive the completion information and may store the completion information in the completion queue 412 (⑤).

In an exemplary embodiment, the components 421 to 423 of the FPGA 420 may be implemented in a hardware manner, in a software manner, or in a combination thereof. In the case of using the hardware manner, the components 421 to 423 may be variously implemented by using a register, a latch, a flip-flop, a logic circuit, a logic gate, etc. The data buffer 421 and the completion queue buffer 423 may correspond to areas allocated on the on-chip memory included in the FPGA 420. In an exemplary embodiment, the controller 431 may be implemented in a hardware manner, in a software manner, or in a combination thereof.

Figure 11:
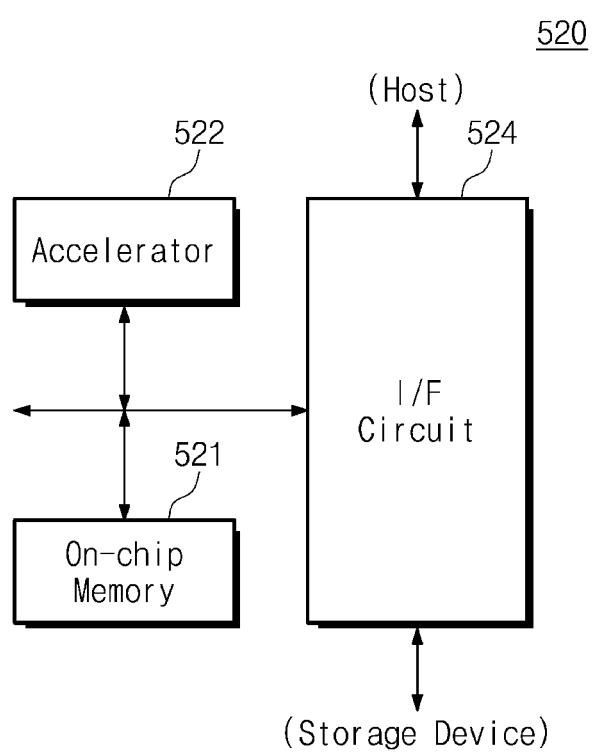
FIG. 11 illustrates a block diagram of one of FPGAs described with reference to FIGS. 3 to 10.

FIG. 11 illustrates a block diagram of one of FPGAs described with reference to FIGS. 3 to 10. An FPGA 520 may be one of the FPGAs 220 to 420. The FPGA 520 may include an on-chip memory 521, an accelerator 522, and an interface circuit 524.

The on-chip memory 521 may include a latch, a register, an SRAM, a DRAM, a TRAM, a tightly coupled memory (TCM), etc. The on-chip memory 521 may include the data buffer 221, 321, or 421 and the completion queue buffer 323 or 423, which are described above. Areas of the data buffer 221, 321, or 421 and the completion queue buffer 323 or 423 may be allocated to the on-chip memory 521.

The accelerator 522 may execute a calculation on data stored in a data buffer of the on-chip memory 521. The accelerator 522 may correspond to the accelerator 222, 322, or 422 described above. The accelerator 522 may include an arithmetic logic unit (ALU), a floating point unit (FPU), a register, a latch, a flip-flop, a logic circuit, a logic gate, etc. and may execute various calculation operations.

The interface circuit 524 may communicate with the outside (e.g., the host 11, 210, 310, or 410, the root complex 120, the electronic devices 141, 151, 153, 161, and 162, and the storage device 230, 330, or 430: refer to FIGS. 2 to 10) in compliance with an interface protocol. For example, the interface circuit 524 may be connected with the downstream port DP and the upstream port UP described with reference to FIG. 2. For example, the interface protocol may be USB, SCSI, PCIe, M-PCIe, NVMe, ATA, PATA, SATA, SAS, IDE, UFS, Firewire, etc. The interface circuit 524 may receive data from the host 210, 310, or 410 and may transmit the received data or calculated data generated by the accelerator 522 to the storage device 230, 330, or 430. The interface circuit 524 may receive data from the storage device 230, 330, or 430 and may transmit one of the received data and calculated data generated by the accelerator 522 to the host 210, 310, or 410. In detail, the interface circuit 524 may receive data from the DMA engine 332, may then receive completion information from the DMA engine 432, and may provide the data and the completion information to a data buffer and a completion queue buffer of the on-chip memory 521, respectively. For example, the interface circuit 524 may transmit one of data generated by the accelerator 522 and data received from the DMA engine 432 to the host 310 and may then transmit the completion information stored in the completion queue buffer of the on-chip memory 521 to the host 410 (refer to operation S350 and operation S355 of FIG. 7). In detail, when the calculation executed by the accelerator 522 is completed, the interface circuit 524 may transmit the completion information stored in the completion queue buffer of the on-chip memory 521 to the host 310.

Figure 12:
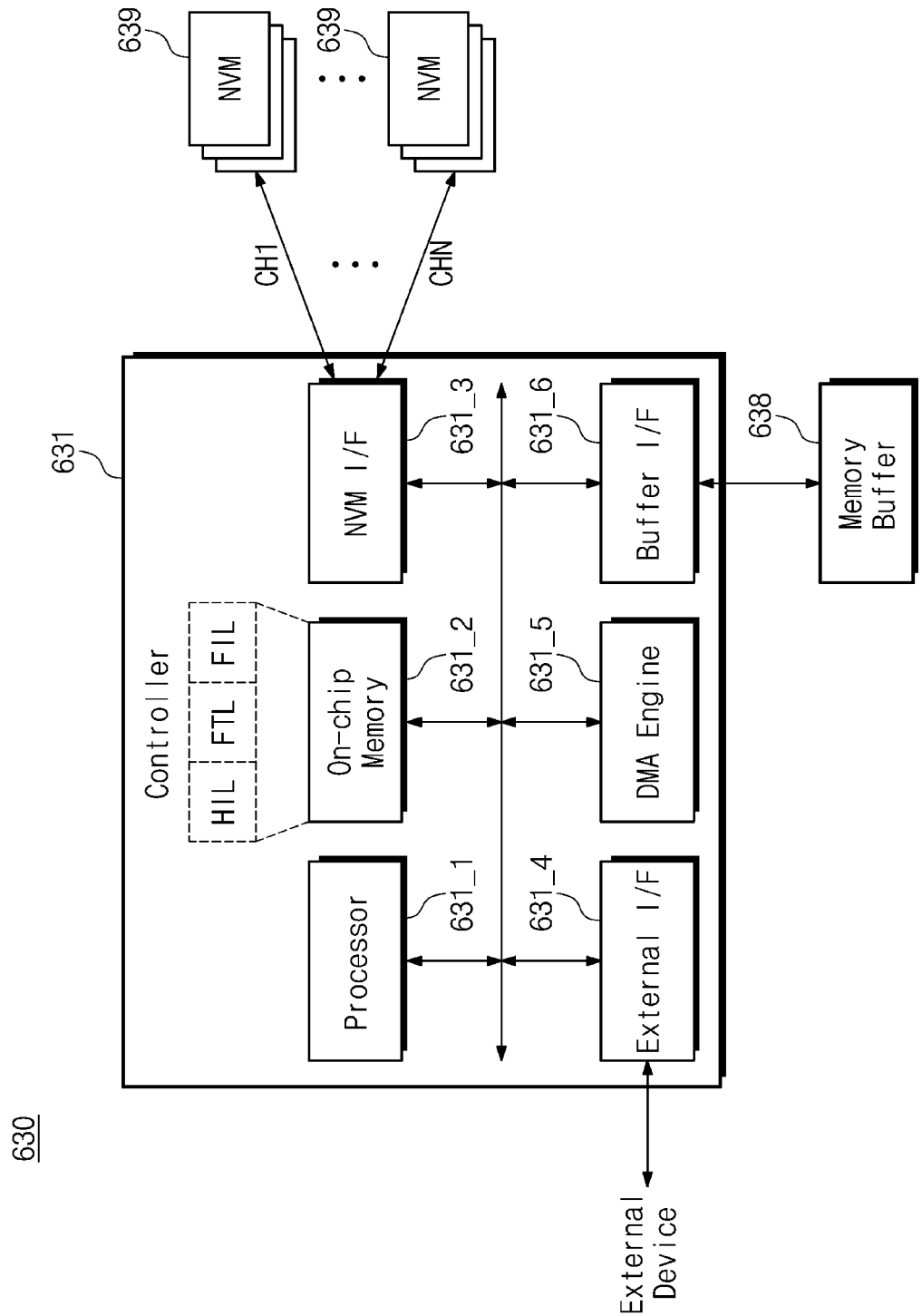
FIG. 12 illustrates a block diagram of one of storage device described with reference to FIGS. 3 to 10.

FIG. 12 illustrates a block diagram of one of storage devices described with reference to FIGS. 3 to 10. A storage device 630 may be one of the storage devices 230, 330, or 430. The storage device 630 may include a controller 631, a memory buffer 638, and nonvolatile memories 639.

The controller 631 may be implemented with an SoC, an ASIC, an FPGA, etc. The controller 631 may include a processor 631_1, the on-chip memory 631_2, a nonvolatile memory interface circuit 631_3, an external interface circuit 631_4, a DMA engine 631_5, and a buffer interface circuit 631_6. The processor 631_1 may control the components 631_2 to 631_6 of the controller 631. The processor 631_1 may include at least one or more cores (e.g., a homogeneous multi-core or a heterogeneous multi-core) and an internal cache memory. The processor 631_1 may execute a program code, software, an application program, etc. loaded onto the on-chip memory 631_2 or the memory buffer 638.

The on-chip memory 631_2 may include a latch, a register, an SRAM, a DRAM, a TRAM, a TCM, etc. Firmware or software such as host interface layer (HIL), a flash translation layer (FTL), and a flash interface layer (FIL) may be loaded onto the on-chip memory 631_2. The HIL may manage an input/output (I/O) command from the outside. The FTL may manage mapping between a logical address provided from the outside and a physical address of the nonvolatile memories 639. The FTL may further perform garbage collection, wear leveling, etc. as well as the above address mapping. The FTL may manage a read operation and a write operation of the nonvolatile memories 639.

The nonvolatile memory interface circuit 631_3 may communicate with the nonvolatile memories 639 in compliance with an interface protocol such as toggle double data rate (DDR). The nonvolatile memory interface circuit 631_3 may communicate with one or more nonvolatile memories 639 through a channel CH1 and may communicate with one or more nonvolatile memories 639 through a channel CHn (n being an integer of 2 or more). The number of channels CH1 to CHn between the controller 631 and the nonvolatile memories 639 may be one or more, the number of nonvolatile memories allocated to one channel may be one or more, and each of the nonvolatile memories 639 may be one of the nonvolatile memories 239, 339, or 439 described with reference to FIGS. 3 to 10. Under control of the processor 631_1, the nonvolatile memory interface circuit 631_3 may transmit write data transmitted from the outside (e.g., the host 11, the root complex 120, the electronic devices 141, 151, 153, 161, and 162, and the FPGA 220, 320, or 420: refer to FIGS. 2 to 10) to the nonvolatile memories 639, and the write data may be stored in the nonvolatile memories 639. The nonvolatile memory interface circuit 631_3 may receive read data transmitted from the nonvolatile memories 639 under control of the processor 631_1.

The external interface circuit 631_4 may communicate with the outside (e.g., the host 11, the root complex 120, the electronic devices 141, 151, 153, 161, and 162, and the FPGA 220, 320, or 420: refer to FIGS. 2 to 10) in compliance with an interface protocol. For example, the interface protocol may be USB, SCSI, PCIe, M-PCIe, NVMe, ATA, PATA, SATA, SAS, IDE, UFS, Firewire, etc. For example, the external interface circuit 631_4 may be connected with the end point port EP described with reference to FIG. 2.

Under control of the processor 631_1, the DMA engine 631_5 may directly access various memory buffers 130, HMB, 211 to 213, 311 to 313, 321, 323, 411 to 413, 421, and 423 of the outside (e.g., the host 11, the root complex 120, the electronic devices 141, 151, 153, 161, and 162, and the FPGA 220, 320, or 420: refer to FIGS. 2 to 10). For example, the DMA engine 631_5 may access one of the above memory buffers, may receive a command, may receive write data, and may transmit read data of the storage device 630. The DMA engine 631_5 may access the on-chip memory 631_2 and the memory buffer 638 of the storage device 630 and may exchange data therewith.

The buffer interface circuit 631_6 may communicate with the memory buffer 638 in compliance with an interface protocol such as a DDR standard. The buffer interface circuit 631_6 may exchange data with the memory buffer 638 under control of the processor 631_1. The memory buffer 638 may include a latch, a register, an SRAM, a DRAM, a TRAM, a TCM, etc. For example, the memory buffer 638 may be placed outside the controller 631 or may be placed inside the storage device 630. For another example, the memory buffer 638 may not be included in the storage device 630. In the case where the memory buffer 638 is included in the storage device 630, the processor 631_1 may use, as a cache memory, the memory buffer 638 as well as the on-chip memory 631_2. In an exemplary embodiment, the controller 431 may perform operation S315, operation S320, operation S330, operation S335, operation S415, operation S420, operation S450, and operation S455 associated with the storage devices 330 and 430 described with reference to FIGS. 7 and 10.

Figure 13:
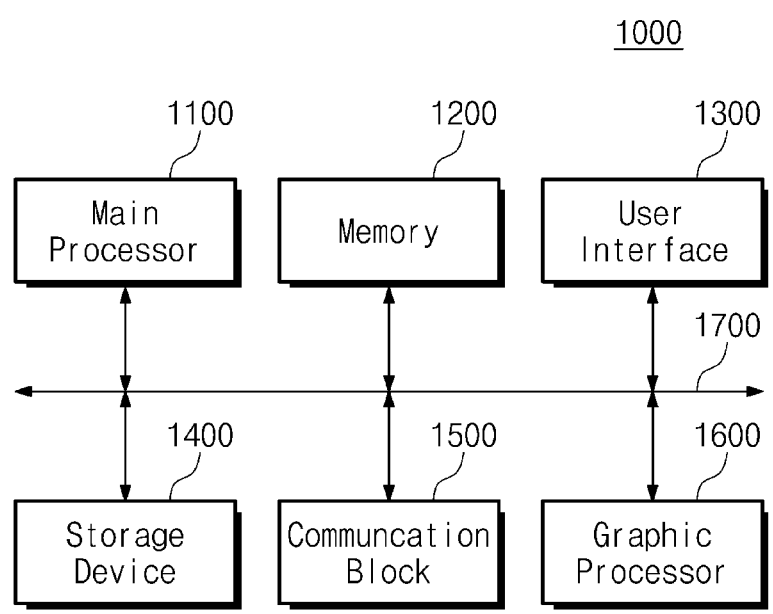
FIG. 13 illustrates a block diagram of a computing device according to an application example of the disclosure.

FIG. 13 illustrates a block diagram of a computing device according to an application example of the disclosure. In the computing systems 10 and 100 to 400 described with reference to FIGS. 1 to 10, various embodiments of the disclosure may be applied to a computing device 1000. The computing device 1000 may include a main processor 1100, a memory 1200, a user interface 1300, a storage device 1400, a communication block 1500, and a graphic processor 1600. For example, the computing device 1000 may be also referred as a "mobile device".

The main processor 1100 may control overall operations of the computing device 1000. The main processor 1100 may be configured to process various kinds of arithmetic operations or logical operations. The main processor 1100 may be implemented with, but is not limited to, a dedicated logic circuit, an FPGA, an ASIC, or an SoC, which includes one or more processor cores. The main processor 1100 may be implemented with a general-purpose processor, a special-purpose processor, or an application processor. For example, each of the hosts 11 and 210 to 410 and the processor 110 may correspond to the main processor 1100.

The memory 1200 may temporarily store data that are used for an operation of the computing device 1000. The memory 1200 may store data processed or to be processed by the main processor 1100. For example, the memory 1200 may correspond to the memory 130 described above.

The user interface 1300 may perform communication mediation between a user and the computing device 1000 under control of the main processor 1100. For example, the user interface 1300 may process inputs from a keyboard, a mouse, a keypad, a button, a touch panel, a touch screen, a touch pad, a touch ball, a camera, a gyroscope sensor, a vibration sensor, etc. In addition, the user interface 1300 may process outputs that are to be provided to a display device, a speaker, a motor, etc.

The storage device 1400 may include a storage medium capable of storing data regardless of whether a power is supplied. For example, the storage device 1400 may be one of the electronic devices 12, 13, 141, 142, 151 to 154, and 161 to 163, the FPGAs 220 to 420, or the storage devices 230 to 430 described with reference to FIGS. 1 to 10. The storage device 1400 may be an intermediate device, another intermediate device and another endpoint device connected to the storage device 1400 may be further included in the computing device 1000.

The communication block 1500 may communicate with an external device/system of the computing device 1000 under control of the main processor 1100. For example, the communication block 1500 may communicate with the external device/system of the computing device 1000 based on at least one of various wired communication protocols, such as an Ethernet, a transfer control protocol/Internet protocol (TCP/IP), a universal serial bus (USB), and firewire and/or at least one of various wireless communication protocols, such as long term evolution (LTE), worldwide interoperability for microwave access (WiMax), global system for mobile communications (GSM), code division multiple access (CDMA), Bluetooth, near field communication (NFC), wireless-fidelity (Wi-Fi), and radio frequency identification (RFID).

The graphic processor 1600 may include a plurality of processor cores (e.g., graphic processing units). The processor cores included in the graphic processor 1600 may quickly process graphic data in parallel. For example, the graphic processor 1600 may process various graphic operations, such as pixel shader, super-sampling, and color space transform, by using the processor cores.

Each of the main processor 1100, the memory 1200, the user interface 1300, the storage device 1400, the communication block 1500, and the graphic processor 1600 may be implemented with a device of a circuit level, a chip level, and/or a package level so as to be mounted in the computing device 1000. Alternatively, each of the main processor 1100, the memory 1200, the user interface 1300, the storage device 1400, the communication block 1500, and the graphic processor 1600 may be implemented with an independent electronic device so as to be assembled within the computing device 1000. The mounted or assembled components may be connected to each other over a bus 1700.

The bus 1700 may provide a communication path between the components of the computing device 1000. The components of the computing device 1000 may exchange data with each other based on a bus format of the bus 1700. For example, the bus format may include one or more of various protocols such as PCIe, NVMe, SCSI, ATA, PATA, SATA, SAS, and UFS.

According to an exemplary embodiment of the disclosure, because an FPGA includes a completion queue buffer being a replica of a completion queue of a host, a storage device may early transmit completion information compared to the case where an FPGA does not include the completion queue buffer. Accordingly, a latency necessary to complete a command issued by the host may be improved.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While the disclosure has been described with reference to exemplary embodiments thereof, it will be apparent to those of ordinary skill in the art that various changes and modifications may be made thereto without departing from the spirit and scope of the disclosure as set forth in the following claims.

What is claimed is:

1. A computing system comprising:
a host;
a first electronic device including a memory and an accelerator; and
a second electronic device including a direct memory access (DMA) engine, wherein, based on a command transmitted from the host through the first electronic device, the DMA engine transmits data and completion information of the command to the first electronic device, wherein:
the memory includes a data buffer storing the data and a completion queue buffer storing the completion information received from the second electronic device,
the accelerator executes a calculation on the data stored in the memory, and
the DMA engine transmits the data to the first electronic device and then transmits the completion information to the first electronic device instead of the host.

2. The computing system of claim 1, wherein:
the first electronic device is a field programmable gate array (FPGA), and
the second electronic device is a nonvolatile memory express (NVMe) device.

3. The computing system of claim 1, wherein the DMA engine transmits the completion information to the first electronic device before the calculation is completely executed by the accelerator.

4. The computing system of claim 1, wherein the first electronic device further includes an interface circuit configured to transmit one of calculated data generated by the accelerator and the data to the host and then to transmit the completion information stored in the completion queue buffer to the host.

5. The computing system of claim 4, wherein the interface circuit receives the data from the second electronic device, then receives the completion information from the second electronic device, and provides the data and the completion information to the data buffer and the completion queue buffer, respectively.

6. The computing system of claim 1, wherein the accelerator accesses the completion queue buffer with reference to an address of the completion queue buffer placed in the memory and an identifier of the command.

7. The computing system of claim 6, wherein the completion information includes the identifier of the command.

8. The computing system of claim 1, wherein the completion queue buffer stores the completion information about the command while the accelerator executes the calculation on the data.

9. A computing system comprising:
a host;
a first electronic device configured to communicate with the host; and a second electronic device configured to communicate with the host through the first electronic device and to transmit data to the first electronic device and completion information to the first electronic device instead of the host, wherein:

the first electronic device includes:

a memory:

including a data buffer receiving the data from the second electronic device, which receives a command from the host through the first electronic device, and a completion queue buffer receiving the completion information about the command from the second electronic device;

an accelerator configured to execute a calculation on the data stored in the memory; and an interface circuit configured to transmit the completion information stored in the completion queue buffer to the host when the calculation is completely executed by the accelerator.

10. The computing system of claim 9, wherein the second electronic device includes a DMA engine configured to fetch the command and to transmit the data and the completion information to the first electronic device based on the command.

11. The computing system of claim 10, wherein the accelerator accesses the completion queue buffer with reference to an address of the completion queue buffer placed in the memory and an identifier of the command.

12. The computing system of claim 11, wherein the completion information includes the identifier of the command.

13. The computing system of claim 10, wherein the DMA engine transmits the data to the first electronic device and then transmits the completion information to the first electronic device.

14. The computing system of claim 10, wherein the DMA engine transmits the completion information to the first electronic device before the calculation is completely executed by the accelerator.

15. The computing system of claim 9, wherein the interface circuit transmits one of calculated data generated by the accelerator and the data to the host and then transmits the completion information stored in the completion queue buffer to the host.

16. A computing system comprising:

a host configured to manage a submission queue of a host memory buffer, in which a command is written, and a completion queue of the host memory buffer, in which completion information about the command is written;

a first electronic device including a memory and an accelerator, wherein:

the memory includes a data buffer storing data requested by the command and a completion queue buffer storing the completion information received from the second electronic device, and the accelerator executes a calculation on the data stored in the memory; and a second electronic device configured to fetch the command through the first electronic device and to transmit the data and the completion information to the first electronic device instead of the host based on the command.

17. The computing system of claim 16, wherein the first electronic device transmits the completion information stored in the completion queue buffer to the host when the calculation is completely executed by the accelerator.

18. The computing system of claim 17, wherein the first electronic device transmits one of calculated data generated by the accelerator and the data to the host and then transmits the completion information stored in the completion queue buffer to the host.

19. The computing system of claim 16, wherein the second electronic device transmits the data to the first electronic device and then transmits the completion information to the first electronic device.

20. The computing system of claim 19, wherein the second electronic device transmits the completion information to the first electronic device before the calculation is completely executed by the accelerator.

* * * * *